United States Patent [19]
McLaughlin et al.

[11] 4,064,516
[45] Dec. 20, 1977

[54] REFLEX CAMERA LIGHT DETECTING ARRANGEMENT

[75] Inventors: Thomas D. McLaughlin, Thousand Oaks; Richard M. Altman, Woodland Hills, both of Calif.

[73] Assignee: Optigon Research & Development Corporation, Santa Monica, Calif.

[21] Appl. No.: 665,557

[22] Filed: Mar. 10, 1976

[51] Int. Cl.² .............................................. G03B 13/02
[52] U.S. Cl. ..................................... 354/31; 354/219; 354/224
[58] Field of Search ................. 354/23, 31, 56, 59, 354/152, 155, 200, 201, 219, 224, 225, 199

[56] References Cited

U.S. PATENT DOCUMENTS

| 3,478,663 | 11/1969 | Tsuruoka et al. | 354/56 |
| 3,620,147 | 9/1968 | Ataka et al. | 354/155 |
| 3,631,784 | 1/1972 | Jurenz | 354/56 |
| 3,710,699 | 1/1973 | Mitani | 354/59 |
| 3,864,702 | 2/1975 | Sugiyama et al. | 354/56 |
| 3,952,321 | 4/1976 | Matui | 354/155 |
| 3,967,287 | 6/1976 | Kimura et al. | 354/225 |
| 3,996,594 | 12/1976 | Okuno et al. | 354/59 |

FOREIGN PATENT DOCUMENTS

| 11,390 | 6/1965 | Japan | 354/152 |
| 214,970 | 8/1967 | Sweden | 354/152 |

Primary Examiner—Stephen J. Tomsky
Assistant Examiner—Alan Mathews
Attorney, Agent, or Firm—DeLio and Montgomery

[57] ABSTRACT

A light detecting system for a single lens reflex camera in which an image of the focusing screen is reflected to the normally unused surface of the pentaprism from a partially reflective surface in the viewfinder system. The reflective surface in one form may be glass-to-air interfaces on the viewfinder axis in the eyepiece, but also may be a thin partially reflecting coating.

14 Claims, 5 Drawing Figures

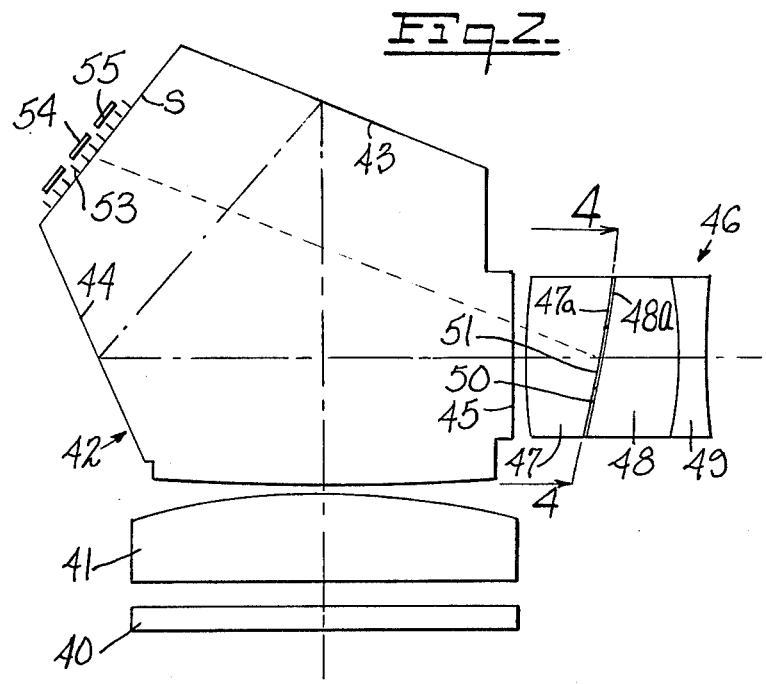
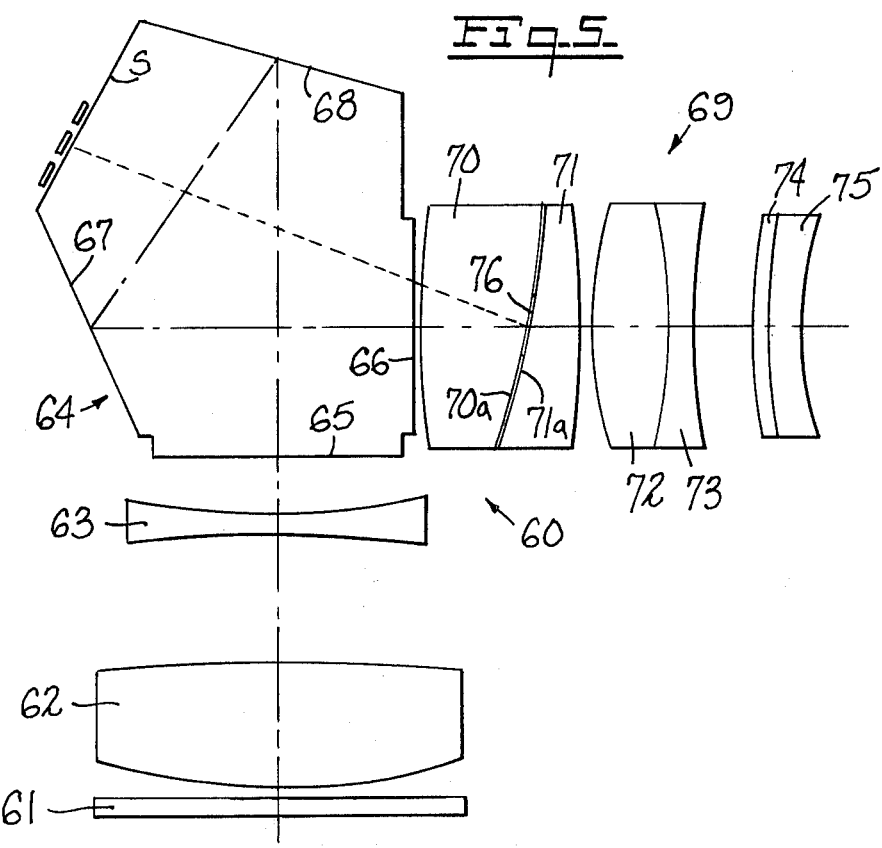

REFLEX CAMERA LIGHT DETECTING ARRANGEMENT

This invention relates to cameras and more particularly relates to imaged light detecting and measuring systems.

It is conventional practice to provide image light detecting systems in cameras to meter the light on a subject entering the lens of a camera. In cameras of the single lens reflex type, light sensitive devices have been positioned within the camera at a variety of locations to detect the light intensity of an imaged object.

The measured light intensity is utilized to determine automatically lens aperture or shutter speed or the readings may be used to provide information to the photographer so that he can manually set shutter speed and/or aperture opening dependent on the film used and exposure desired. Alternatively, the camera may include a so-called match needle system or other type indicating device to indicate when a correct aperture has been set in relation to selected shutter speed.

Various light metering systems may operate to provide center spot metering of an object, averaging of an entire scene, or weighted averaging of the scene.

In single lens reflex cameras, the viewing system has an optical path which is partially coincident with and a continuation of the objective optical path. Thus photodetectors positioned within the camera to detect the light entering the lens are also subjected to some light entering the eyepiece of the viewing system. Various locations of the photosensitive elements have been proposed to eliminate detection of unwanted and reflected light in the viewing system in attempts to obtain more accurate light intensity readings.

A further consideration is the desirability of obtaining true spot readings to enable good film exposure for back-lighted subjects. Since the spot detection is obtained on or from the optical axis of the viewing system or objective, prior positioning of the spot detecting device has also been subject to light entering the eyepiece.

In view of these known difficulties in light detecting and metering systems of single lens reflex cameras, the present invention provides a light detecting and metering system which substantially eliminates or reduces to a very low level the effect of light from the eyepiece on the light detecting and metering system, and further enables simplified true spot metering.

Briefly stated, the invention makes use of the normally unused surface of the pentaprism of a single lens reflex camera to detect the light intensity of an imaged object. A surface which is inclined to the optical axis of the viewfinder is defined behind the second (forward) reflecting surface of the pentaprism. This inclined surface includes a partially reflecting portion preferably on or near the optical axis of the viewfinder which reflects a reduced image of the viewing screen to the normally unused surface of the prism. The position of the image on the normally unused surface permits true spot metering, as well as other types of total area averaging. Additionally, baffling means may be provided on said unused surface of the prism to eliminate internally reflected light from light detectors.

An object of this invention is to provide a new and improved light detecting system for a single lens reflex camera which decreases to a very low level the effect of light entering the eyepiece on the metering system.

Another object of this invention is to provide a new and improved light detecting system for obtaining a true spot indication of the image.

A further object of this invention is to provide a light detecting system for a single lens reflex camera in which the surface of the prism utilized for metering purposes in effectively baffled from internally reflected light in the prism.

The features of the invention which are believed to be novel are particularly pointed out and distinctly claimed in the concluding portion of this specification. However, the invention together with further objects and advantages thereof may best be appreciated by reference to the following detailed description taken in conjunction with the drawings, wherein:

FIG. 2 is a side elevation of another embodiment of the invention;

FIG. 5 is a side elevation of another viewing system embodying the invention.

Figure 1:
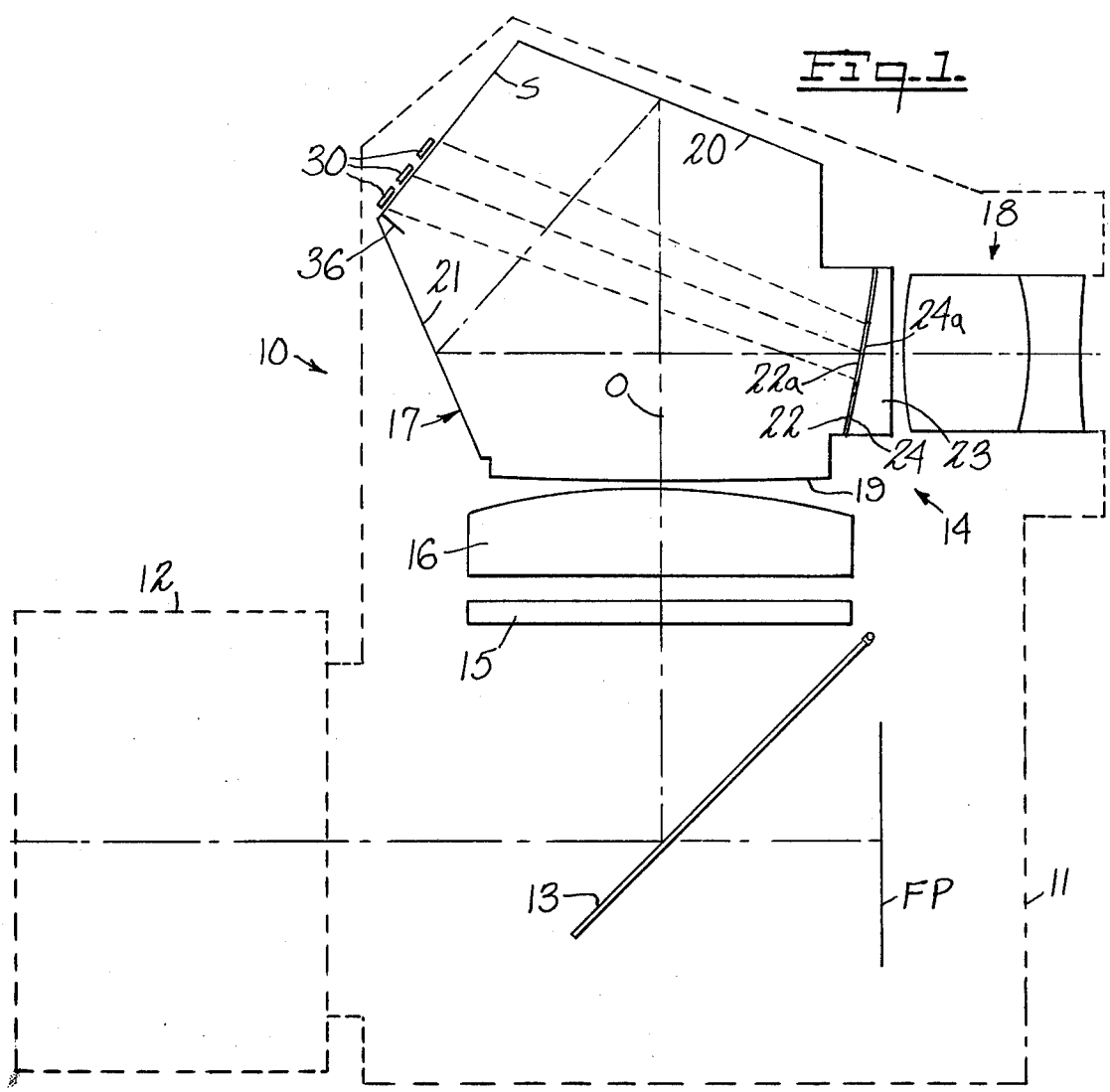
FIG. 1 is a side elevation of a viewing system embodying the invention in a single lens reflex camera.

FIG. 1 exemplifies the viewing system of a single lens reflex camera 10. The camera includes a body 11 having an objective lens 12 interchangeably mounted thereto, a pivotal mirror 13 before focal plane FP, and a viewfinder system 14.

The viewfinder system comprises a viewing and focusing screen 15 having a fresnel surface and a central microprism or other focusing arrangement (not shown), a field lens 16, a pentaprism 17, and an eyepiece 18.

An image of an object seen by the lens 12 is focused on screen 15, and thereafter viewed by the photographer through eyepiece 18.

The pentaprism 17 has an entrance face or surface 19, first reflecting surfaces 20 and a second reflecting surface 21. The surfaces 20 are the usual roof type defined at angles of 90° to each other. The surfaces 20 and 21 are joined by a normally unused or non-reflecting surface S. The optical axis of the system is indicated by the axis O, and it is apparent that the optical axis of the viewfinder is essentially a reflected continuation of the objective axis. Since the viewfinder system is a magnifier there may be a non-coincidence without detrimental effect.

Instead of the normal exit window in the vertical plane the rear of the prism is formed with the surface 22 defined in a plane or surface substantially at a small angle to the perpendicular of the optical axis. Cemented to surface 22 is an element 23 having a surface 24 complementary to surface 22. Surfaces 22 and 24 may be planar but preferably are slightly curved. Surfaces 22 and 24 may be effectively coated with a non-reflective coating except for portions 22a and 24a. The portions 22a and 24a are illustrated as being on the optical axis but may be positioned anywhere on the surfaces to reflect to surface S. The center portions 22a and 24a define glass-to-air and air-to-glass interfaces, respectively, in one form. The spacing between surfaces 22 and 24 is only about fifty microns, the thickness of the bonding cement.

The non-reflective coating may be a coating of a cement or film as, for example, zinc sulfide and magnesium fluoride. Alternatively, the surfaces 22a and 24 may be a plurality of alternate films of zinc sulfide and magnesium fluoride to provide partially reflective surfaces. A plurality of such coatings will be partially reflecting. The glass-to-air or film-to-glass surfaces are angled so as to reflect a small image of the screen 15 to surface S of the prism. Photodetectors 30 in any configuration thereof may be positioned on or adjacent to surface S to measure the light intensity thereat in any desired pattern. One detector, as hereinafter shown, is positioned to read the exact center of the screen only and thereby give a true spot indication of the center.

The photodetectors may be positioned in any desired pattern and selectively electrically connectable to give several different types of readings, for example, spot, average, center weighted average, etc. With this arrangement it will be seen that if one retraces the optical axis O from eyepiece 18 there is little possibility of light entering the prism through the eyepiece 18 reaching surface S. However, to further minimize this possibility one or a plurality of slits or trenches 36 are defined in surface S on the side adjacent reflecting surface 21 and filled with a light absorbing substance to baffle any stray light from surface 21 reaching the photodetectors at surface S. Such baffling may be accomplished in other ways, as hereinafter described.

Reference is now made to FIG. 2 which exemplifies another viewfinder system comprising a viewing and focusing screen 40, a field lens 41, pentaprism 42 having reflecting surfaces 43 and 44 with surface S therebetween, exit surface 45 and an eyepiece 46.

Figure 3:
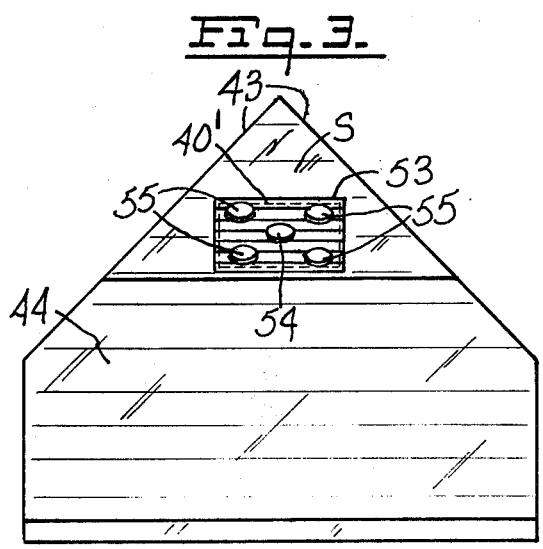
FIG. 3 is a front view of the prism of FIG. 2.

Eyepiece 46 comprises three elements 47, 48 and 49. Surfaces 47a and 48a of elements 47, 48 and optionally coated with a non-reflective coating 50 as previously described except for the small section 51. Alternatively, a small area between surfaces 47a and 48a has partially reflecting coatings thereon. Surfaces 47a and 48a are defined on radii of about 204mm from a point approximately 10° to 11° above axis O, and in accordance with the geometry of the prism reflect an image 40' of screen 40 to surface S, as shown in FIG. 3.

Center section 51 is substantially on or close to the axis O, and is preferably in the range of five to seven millimeters in diameter. Alternatively, the section 51 may be defined on a rectangle. In FIG. 2, the reflecting surfaces are moved closer to the viewing position of the eye and therefore will be hardly noticeable in the viewed field. By way of example, in the system of FIG. 2, the axial dimensions of the elements 47, 48 and 49 may be

| Element | Axial Dimension |
|---------|-----------------|
| 47 | 4.600mm |
| 48 | 5.900 |
| 49 | 1.500 | and the distance to the optimum eye viewing position is 12.6mm. The spacing between element 47 and prism exit surface 45 is about 0.800mm, a clearance dimension.

In FIG. 2 a baffling member 53 comprising a plurality of parallel vane-like members is disposed between surface S and photodetector elements 54 and 55 to block any light reflected from surface 44 from affecting the photodetectors.

Where the reflecting surfaces of the eyepiece are glass-to-air and air-to-glass, slightly less than eight percent of the light incident thereon will be reflected to surface S. Each interface will reflect about four percent of the light incident thereon. This small reflection coupled with the closeness of the reflective spot to the pupil of the eye will render the spot 51 unnoticeable to the normal eye and darkening of the center of the focusing screen will not be noted by most eyes. The same holds true if a partially reflective coating is applied to the reflecting area. It is also to be understood that the entire surface may be made partially reflective since only about 4% of the light need be reflected.

Figure 4:
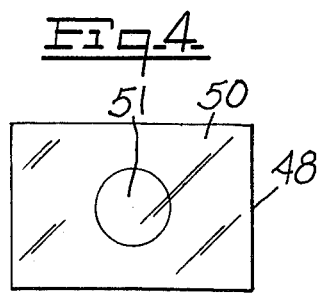
FIG. 4 is a view seen on lines 4—4 of FIG. 2.

FIG. 4 is a view of the clear aperture at surface 47a, and exemplifies the small area 51 of the reflective portion of surfaces 47a and 48a.

A viewfinder system as shown in FIG. 2 designed for a 24×36mm image frame single lens reflex camera has clear apertures of substantially 24×36mm for screen 40 and field lens 41 and about 11×16mm for the eyepiece elements. The partially reflecting spot 51 of about 5.0mm size spaced only about twenty millimeters from the eye would not be noticeable to normal vision or eyeglass corrected normal vision.

FIG. 2 exemplifies the positioning of a center spot photodetector 54 on the center of image 40' to obtain a true center spot reading, while photodetectors 55 are arranged for average readings or center weighted average in combination with photodetector 54.

FIG. 5 exemplifies the invention in a viewfinder system 60 where the field lens is positionable in accordance with the position of the objective lens exit pupil and the eyepiece is positionable in accordance with the position of the field lens. Such viewfinder system is disclosed and claimed in copending applications Application Ser. Nos. 674,229 and 648,779 filed Jan. 13, 1976, the disclosures of which are incorporated herein by reference.

The system 60 comprises a viewing and focusing screen 61, field lens 62 which is positionable between screen 61 and a negative power lens 63. A prism 64 having entrance surface 65 and exit surface 66, reflecting surfaces 67 and 68 with non-reflecting surface S therebetween and an eyepiece 69. Eyepiece 69 comprises elements 70 and 71, and 72 and 73 which are positionable with field lens 62 to avoid change in magnification of the image when the field lens is moved. Also elements 74, 75 move with field lens 62 to maintain focus. Elements 70 and 71 are cemented and have non-reflective coatings thereon at the mating surfaces except for the spot 76. The surfaces 70a and 71a are defined on a radii of approximately seventy-one millimeters from a point at an angle of about 11° above the axis O. The lens group defined by elements 70 – 73 is movable approximately 2.3mm away from a normal spacing of 0.500mm from exit window 66. This small movement of the spot 76 produces very little movement of the reflected image of the screen on surface S.

The surfaces 70a and 71a of FIG. 5 and also 47a and 48a of FIG. 2 have the slight curvatures specified to give the best available image of the focusing screen at the surface S.

The distance of the spot 76 to the optimum viewing position of the eye is 30.4mm.

The reflectivity of the spots 51 and 76 may be increased by partially silvering or otherwise placing a partially reflective coating thereon if greater light intensity is desired on surface S. The only limitation to the degree of reflectivity of the spot is the degree of darkening that would appear in the middle of the focusing screen to the viewer.

The invention may also be utilized in viewfinding systems where no separate field lens is provided and where the entrance surface of the prism may be made convex for positive power.

The partially reflecting surface or surfaces may be round or rectangular. It is preferred that the major dimension of the reflecting surface or spot be no greater than one-half the major dimension of the clear aperture of the total surface on which it is defined; however, the entire surface may be partially reflective. Additionally, the reflective area may be defined on a convex or plano lens surface dependent on the lens power and the eyepiece element surface utilized.

From the foregoing it may be seen that the invention provides a viewfinder system in which the image of the focusing screen is derived preferably from an area on or close to the optical axis of the viewing system and reflected to the normally unused front surface of the pentaprism in such manner that is effectively out of the path of any light entering the eyepiece. However, the reflective area may be positioned on a selected surface at any location from which it can reflect to the prism surface S. Moreover, the location of the image of the focusing screen is such that true and accurate center spot metering may be accomplished as well as averaging center weighted averaging or any other desired metering arrangement.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In a camera of the reflex type which has an optical path including a mirror adapted to reflect light from a lens to a focusing screen to produce an image formed by the lens thereon, a system for viewing the image on the screen comprising a pentaprism having light entrance and exit surfaces with first and second reflecting surfaces therebetween on said optical path, said prism having a planar third surface not on said optical path extending between said reflecting surfaces, and an eyepiece lens on said optical path behind said exit surface, said eyepiece lens having elements defined by front and rear surfaces, the improvement comprising; means defining a partial light reflecting surface at one of said exit surface and an eyepiece element surface in said optical path, said partially reflecting surface angled from the perpendicular to said optical path to reflect an image of said focusing screen to said third surface on said prism, and light detecting means located adjacent the third surface at the position of the image reflected thereto by said partially reflecting surface.

2. The system of claim 1 where said eyepiece lens comprises two elements have complementary facing surfaces joined, said facing surfaces being coated with anti-reflective material except about a portion thereof whereby said uncoated antireflection portion provides said partially reflecting surface.

3. The system of claim 1 wherein said eyepiece lens comprises two elements having complementary facing surfaces joined, said surfaces having a partially reflecting coating on a portion thereof to provide said partially reflecting area.

4. The system of claim 2 wherein said facing surfaces are concave to said third surface.

5. The system of claim 3 wherein said facing surfaces are concave to said third surface.

6. The system of claim 1 wherein said partially reflecting surface is defined by a glass-to-air interface.

7. The system of claim 1 wherein said partially reflecting area is a thin film on said exit surface.

8. The system of claim 1 wherein the area of said partially reflective surface is a spot having a major dimension less than half of the major dimension of the clear aperture of said eyepiece.

9. The system of claim 1 wherein said partially reflective surface reflects approximately 8% of the light incident thereon.

10. The system of claim 2 wherein said eyepiece lens is movable along said optical path.

11. The system of claim 1 wherein said partially reflecting surface is concave to said third surface.

12. The system of claim 1 further including light baffling means disposed between said detecting means and said third surface to block any reflected light from said second reflecting surface.

13. The system of claim 1 wherein at least one trough is defined in said third surface substantially parallel to its juncture with said second reflecting surface, said trough filled with a non-transparent material to block any reflection of light from said second reflecting surface to said third surface.

14. The system of claim 2 wherein said uncoated portions of said facing surfaces define a glass-to-air and an air-to-glass interface.

* * * * *